(12) United States Patent
Tsuji

(10) Patent No.: US 10,704,228 B2
(45) Date of Patent: Jul. 7, 2020

(54) CONTROL SYSTEM FOR WORK VEHICLE, CONTROL METHOD THEREOF, AND METHOD OF CONTROLLING WORK VEHICLE

(71) Applicant: KOMATSU LTD., Tokyo (JP)

(72) Inventor: Hideki Tsuji, Komatsu (JP)

(73) Assignee: KOMATSU LTD., Tokyo (JP)

( * ) Notice: Subject to any disclaimer, the term of this patent is extended or adjusted under 35 U.S.C. 154(b) by 277 days.

(21) Appl. No.: 15/563,972

(22) PCT Filed: Jul. 19, 2016

(86) PCT No.: PCT/JP2016/071143
§ 371 (c)(1),
(2) Date: Oct. 3, 2017

(87) PCT Pub. No.: WO2017/033622
PCT Pub. Date: Mar. 2, 2017

(65) Prior Publication Data
US 2018/0135277 A1    May 17, 2018

(30) Foreign Application Priority Data

Aug. 24, 2015  (JP) .................................. 2015-164483

(51) Int. Cl.
*E02F 9/26* (2006.01)
*E02F 9/20* (2006.01)
*B60K 35/00* (2006.01)
*E02F 3/84* (2006.01)

(52) U.S. Cl.
CPC ............ *E02F 9/2045* (2013.01); *B60K 35/00* (2013.01); *E02F 3/841* (2013.01); *E02F 9/26* (2013.01); *E02F 9/262* (2013.01); *E02F 9/264* (2013.01); *B60K 2370/152* (2019.05); *B60K 2370/176* (2019.05); *B60K 2370/177* (2019.05); *B60K 2370/21* (2019.05); *B60K 2370/52* (2019.05);
(Continued)

(58) Field of Classification Search
None
See application file for complete search history.

(56) References Cited

U.S. PATENT DOCUMENTS 4,852,674 A * 8/1989 Gudat ................... G01G 19/10
177/141
6,157,889 A * 12/2000 Baker ................... G01G 19/12
37/348
(Continued)

FOREIGN PATENT DOCUMENTS

AU    199895225 A1    7/1999
CN    104024541 A     9/2014
(Continued)

*Primary Examiner* — Jonathan M Dager
(74) *Attorney, Agent, or Firm* — Faegre Drinker Biddle & Reath LLP

(57) ABSTRACT

A control system for a work vehicle includes a position determination unit which determines a position of loading on a loaded vehicle based on a state of loading on the loaded vehicle, a display, and a representation control unit which has the display show loading guidance corresponding to the position of loading determined by the position determination unit for a laterally viewed loaded vehicle.

9 Claims, 12 Drawing Sheets

(52) U.S. Cl.
CPC .. *B60K 2370/5915* (2019.05); *B60K 2370/61* (2019.05); *B60R 2300/80* (2013.01)

(56) References Cited

U.S. PATENT DOCUMENTS

| | | | | |
|---|---|---|---|---|
| 6,247,538 | B1* | 6/2001 | Takeda | E02F 3/842 |
| | | | | 172/2 |
| 8,914,199 | B2* | 12/2014 | Nomura | E02F 3/32 |
| | | | | 340/995.27 |
| 9,204,106 | B2* | 12/2015 | Mitsuta | H04N 7/18 |
| 9,313,951 | B2* | 4/2016 | Herman | A01D 43/073 |
| 9,458,598 | B2* | 10/2016 | Takaura | E02F 3/437 |
| 9,624,648 | B2* | 4/2017 | Arimatsu | E02F 3/435 |
| 9,714,497 | B2* | 7/2017 | Hague | E02F 3/434 |
| 9,796,267 | B1* | 10/2017 | Ruth | B60K 35/00 |
| 9,816,253 | B2* | 11/2017 | Yasuda | E02F 9/264 |
| 9,824,490 | B1* | 11/2017 | Cote | E02F 9/245 |
| 9,828,747 | B2* | 11/2017 | Arimatsu | E02F 9/26 |
| 9,868,623 | B1* | 1/2018 | Guy | E02F 9/2054 |
| 10,036,137 | B2* | 7/2018 | Ge | E02F 9/205 |
| D824,925 | S* | 8/2018 | Guy | D14/485 |
| 10,227,754 | B2* | 3/2019 | Taylor | E02F 3/435 |
| 10,234,368 | B2* | 3/2019 | Cherney | G07C 5/008 |
| 10,267,016 | B2* | 4/2019 | Friend | E02F 9/123 |
| 10,280,597 | B2* | 5/2019 | Izumikawa | E02F 9/26 |
| 10,301,794 | B2* | 5/2019 | Moriki | E02F 3/439 |
| 10,301,798 | B2* | 5/2019 | France | E02F 3/32 |
| 10,316,498 | B2* | 6/2019 | Morimoto | E02F 9/262 |
| 10,323,388 | B2* | 6/2019 | Kanari | E02F 9/26 |
| 10,395,445 | B2* | 8/2019 | Pauli | G01G 19/08 |
| 2003/0000115 | A1* | 1/2003 | Green | E02F 3/435 |
| | | | | 37/348 |
| 2003/0001751 | A1* | 1/2003 | Ogura | E02F 9/2296 |
| | | | | 340/691.6 |
| 2004/0020083 | A1* | 2/2004 | Staub | E02F 9/26 |
| | | | | 37/348 |
| 2004/0079557 | A1* | 4/2004 | Saxon | G01G 19/086 |
| | | | | 177/136 |
| 2005/0000703 | A1* | 1/2005 | Furuno | G01G 19/08 |
| | | | | 172/2 |
| 2005/0027420 | A1* | 2/2005 | Fujishima | F02F 9/2045 |
| | | | | 701/50 |
| 2006/0034535 | A1* | 2/2006 | Koch | E02F 9/26 |
| | | | | 382/254 |
| 2007/0010925 | A1* | 1/2007 | Yokoyama | E02F 9/261 |
| | | | | 701/50 |
| 2008/0180523 | A1* | 7/2008 | Stratton | G05D 1/0044 |
| | | | | 348/114 |
| 2008/0234901 | A1* | 9/2008 | Johnson | E02F 9/2029 |
| | | | | 701/50 |
| 2008/0298941 | A1* | 12/2008 | Hagenbuch | B60P 1/006 |
| | | | | 414/517 |
| 2009/0088961 | A1* | 4/2009 | Morey | G01G 19/10 |
| | | | | 701/124 |
| 2009/0256860 | A1* | 10/2009 | Nichols | G01S 19/40 |
| | | | | 345/632 |
| 2011/0178677 | A1* | 7/2011 | Finley | E02F 9/265 |
| | | | | 701/31.4 |
| 2011/0301817 | A1* | 12/2011 | Hobenshield | E02F 9/26 |
| | | | | 701/50 |
| 2012/0290178 | A1 | 11/2012 | Suzuki et al. | |
| 2013/0054133 | A1* | 2/2013 | Lewis | G07C 5/0841 |
| | | | | 701/423 |
| 2013/0158784 | A1* | 6/2013 | Fukano | E02F 9/2033 |
| | | | | 701/34.4 |
| 2013/0158785 | A1* | 6/2013 | Fukano | E02F 9/261 |
| | | | | 701/34.4 |
| 2013/0158786 | A1* | 6/2013 | Fukano | E02F 9/264 |
| | | | | 701/34.4 |
| 2013/0158787 | A1* | 6/2013 | Nomura | E02F 9/264 |
| | | | | 701/34.4 |
| 2013/0158797 | A1* | 6/2013 | Fukano | E02F 9/264 |
| | | | | 701/36 |
| 2014/0058635 | A1* | 2/2014 | Furukawa | B60R 16/02 |
| | | | | 701/50 |
| 2014/0064897 | A1* | 3/2014 | Montgomery | E02F 3/434 |
| | | | | 414/685 |
| 2014/0081530 | A1* | 3/2014 | Hu | B60P 1/283 |
| | | | | 701/50 |
| 2014/0100712 | A1* | 4/2014 | Nomura | E02F 3/32 |
| | | | | 701/1 |
| 2014/0100744 | A1* | 4/2014 | Johnson | E02F 3/32 |
| | | | | 701/50 |
| 2014/0184643 | A1* | 7/2014 | Friend | G09G 3/003 |
| | | | | 345/633 |
| 2014/0188333 | A1* | 7/2014 | Friend | E02F 9/261 |
| | | | | 701/34.4 |
| 2014/0231153 | A1* | 8/2014 | Fukasu | E02F 9/26 |
| | | | | 177/25.13 |
| 2014/0261152 | A1* | 9/2014 | Tanaka | E02F 9/2033 |
| | | | | 116/230 |
| 2014/0288771 | A1* | 9/2014 | Li | E02F 9/261 |
| | | | | 701/34.4 |
| 2014/0293047 | A1* | 10/2014 | Morris | E02F 9/261 |
| | | | | 348/143 |
| 2014/0297040 | A1* | 10/2014 | Baba | G05B 13/026 |
| | | | | 700/275 |
| 2014/0336874 | A1* | 11/2014 | Harshberger, II | G01G 19/083 |
| | | | | 701/36 |
| 2014/0338235 | A1* | 11/2014 | Ryan | E02F 3/435 |
| | | | | 37/443 |
| 2015/0002303 | A1* | 1/2015 | Stanley | G08B 5/36 |
| | | | | 340/666 |
| 2015/0004572 | A1* | 1/2015 | Bomer | G09B 9/042 |
| | | | | 434/219 |
| 2015/0029017 | A1* | 1/2015 | Thoreson | B60K 35/00 |
| | | | | 340/461 |
| 2015/0032373 | A1* | 1/2015 | Ikari | G08G 1/123 |
| | | | | 701/517 |
| 2015/0116495 | A1* | 4/2015 | Kowatari | G06T 11/60 |
| | | | | 348/148 |
| 2015/0199106 | A1* | 7/2015 | Johnson | G06F 3/011 |
| | | | | 715/740 |
| 2015/0218781 | A1* | 8/2015 | Nomura | E02F 3/435 |
| | | | | 701/50 |
| 2015/0308070 | A1* | 10/2015 | Deines | E02F 3/434 |
| | | | | 701/50 |
| 2015/0345114 | A1* | 12/2015 | Nomura | E02F 3/3677 |
| | | | | 37/379 |
| 2015/0376869 | A1* | 12/2015 | Jackson | E02F 1/00 |
| | | | | 701/2 |
| 2016/0010312 | A1* | 1/2016 | Kurihara | E02F 3/435 |
| | | | | 701/36 |
| 2016/0024757 | A1* | 1/2016 | Nomura | E02F 3/435 |
| | | | | 414/687 |
| 2016/0035149 | A1* | 2/2016 | Friend | G07C 5/008 |
| | | | | 701/32.3 |
| 2016/0134995 | A1* | 5/2016 | McCoy | H04L 67/104 |
| | | | | 455/41.2 |
| 2016/0193920 | A1* | 7/2016 | Tsubone | E02F 9/261 |
| | | | | 701/36 |
| 2016/0221582 | A1* | 8/2016 | Sudou | B60C 19/00 |
| 2016/0237655 | A1* | 8/2016 | Baba | E02F 9/262 |
| 2017/0175362 | A1* | 6/2017 | Iwanaga | E02F 3/435 |
| 2017/0292248 | A1* | 10/2017 | Matson | G01C 9/06 |
| 2017/0305018 | A1* | 10/2017 | Machida | E02F 9/261 |
| 2018/0052038 | A1* | 2/2018 | Minoshima | B60P 1/04 |
| 2018/0080193 | A1* | 3/2018 | Myers | E02F 3/34 |
| 2018/0094408 | A1* | 4/2018 | Shintani | G01C 9/04 |
| 2018/0371723 | A1* | 12/2018 | Nishi | G05D 1/0011 |
| 2019/0003152 | A1* | 1/2019 | Nakamura | E02F 9/2029 |
| 2019/0048560 | A1* | 2/2019 | Misaki | G06K 9/00805 |
| 2019/0155315 | A1* | 5/2019 | DeLong | G05D 13/62 |

FOREIGN PATENT DOCUMENTS

| | | |
|---|---|---|
| CN | 104380724 A | 2/2015 |
| EP | 2527541 A1 | 11/2012 |
| EP | 2799630 A1 | 11/2014 |

(56) References Cited

FOREIGN PATENT DOCUMENTS

| | | |
|---|---|---|
| JP | H10-88625 A | 4/1998 |
| JP | H11-310389 A | 11/1999 |
| JP | 2001-55762 A | 2/2001 |
| JP | 2011-505028 A | 2/2011 |
| JP | 5419998 B2 | 2/2014 |
| JP | 2014-129676 A | 7/2014 |
| WO | WO-2009/045329 A2 | 4/2009 |
| WO | WO-2013/099491 A1 | 7/2013 |
| WO | WO-2014/103498 A1 | 7/2014 |

* cited by examiner (A)

(B)

(C)

CONTROL SYSTEM FOR WORK VEHICLE, CONTROL METHOD THEREOF, AND METHOD OF CONTROLLING WORK VEHICLE

TECHNICAL FIELD

The present invention relates to a control system for a work vehicle.

BACKGROUND ART

A work vehicle has conventionally been used to move soil, rocks and stones, and other objects (which are also referred to as a loaded object) from one place to another. For example, a wheel loader can load soil, rocks and stones, and/or other objects on another transportation machine such as a dump truck so that the dump truck can thereafter transport the objects to a waste site.

It is important to balance a load in a box of a dump truck. For example, when load balance is poor in a dump truck, wear of tires may increase, fuel saving may adversely be affected, and mechanical components may be damaged. Braking performance and/or steering performance may also adversely be affected.

Therefore, a work for loading a loaded object from a wheel loader onto an appropriate position in a box of a dump truck should be performed. In this connection, Japanese National Patent Publication No. 2011-505028 shows a scheme for visual representation of a position of loading on a dump truck.

CITATION LIST

Patent Document

PTD 1: Japanese National Patent Publication No. 2011-505028

SUMMARY OF INVENTION

Technical Problem

According to the scheme shown in the document, a box of a dump truck is modeled to show a position of loading on the modeled box, and the scheme is not suitable for an intuitive work for loading of a loaded object.

The present invention was made to solve the problems above, and an object is to provide a control system for a work vehicle which allows an intuitive work for loading of a loaded object, a method thereof, and a method of controlling a work vehicle.

Other tasks and novel features will become apparent from the description herein and the attached drawings.

Solution to Problem

A control system for a work vehicle according to one aspect includes a position determination unit which determines a position of loading on a loaded vehicle based on a state of loading on the loaded vehicle, a display, and a representation control unit which has the display show loading guidance corresponding to the position of loading determined by the position determination unit for the loaded vehicle which is laterally viewed.

According to the present invention, loading guidance is shown for a laterally viewed loaded vehicle and hence an intuitive work for loading of a loaded object can be performed.

Preferably, the display is an optically transparent display. According to the above, loading guidance is shown for a laterally viewed loaded vehicle on the optically transparent display. Therefore, an operator can perform a loading work without looking away from the loaded vehicle and can perform an efficient loading work.

Preferably, the loading guidance is an indication with which an operator can visually recognize a relative position of loading. According to the above, since loading guidance is readily shown for a laterally viewed loaded vehicle on the optically transparent display with an indication with which a loading position can visually be recognized, an operator can perform a loading work without looking away from the loaded vehicle and can perform an efficient loading work.

Preferably, an arrow indicative of a position is adopted as the indication. According to the above, by employing an arrow indicative of a position as the indication, a position can intuitively be recognized and an intuitive loading work can be performed.

Preferably, the control system for a work vehicle further includes an obtaining unit which obtains loading state data transmitted from the loaded vehicle. The position determination unit determines the position of loading on the loaded vehicle based on the loading state data. According to the above, an efficient loading work in accordance with a state of loading can be performed.

Preferably, the position determination unit determines a next position of loading on the loaded vehicle based on a previous state of loading on the loaded vehicle. According to the above, by determining a next loading position based on the previous state of loading, a loaded object can be loaded on the loaded vehicle as being distributed and an efficient loading work can be performed.

Preferably, the control system for a work vehicle further includes an image pick-up portion which obtains image data including the loaded vehicle, an extraction unit which extracts the loaded vehicle included in the image data obtained by the image pick-up portion, and a calculation unit which calculates a position in the loaded vehicle on the display based on the loaded vehicle extracted by the extraction unit. The representation control unit has the display show loading guidance corresponding to the position of loading determined by the position determination unit based on the calculated position in the loaded vehicle for the laterally viewed loaded vehicle.

A control method of a control system for a work vehicle according to one aspect includes inputting data on a state of loading on a loaded vehicle, determining a position of loading on the loaded vehicle based on the data on the state of loading, inputting image data including the loaded vehicle, extracting the loaded vehicle which is laterally viewed, based on the input image data, generating data for loading guidance corresponding to the determined position of loading, and outputting the data for the loading guidance corresponding to the extracted laterally viewed loaded vehicle to the display.

According to the present invention, a loading position is determined based on loading state data and loading guidance is shown for a laterally viewed loaded vehicle. Therefore, an intuitive work for loading of a loaded object can be performed.

A method of controlling a work vehicle according to another aspect includes obtaining data on a state of loading on a loaded vehicle, determining a position of loading on the loaded vehicle based on the data on the state of loading, obtaining image data including the loaded vehicle, extracting the loaded vehicle which is laterally viewed, based on the obtained image data, generating data for loading guidance corresponding to the determined position of loading, and outputting the data for the loading guidance corresponding to the extracted laterally viewed loaded vehicle to the display.

According to the present invention, a loading position is determined based on loading state data and loading guidance is shown for a laterally viewed loaded vehicle. Therefore, an intuitive work for loading of a loaded object can be performed.

Advantageous Effects of Invention

A control system for a work vehicle and a method thereof according to the present invention allow an intuitive work for loading of a loaded object.

DESCRIPTION OF EMBODIMENTS

An embodiment will be described below based on figures. In the description below, "up (above)," "down (below)," "front", "rear", "left", and "right" are terms with an operator seated at an operator's seat being defined as the reference. A wheel loader representing one example of a "work vehicle" or a dump truck representing one example of a "loaded vehicle" will be described with reference to the drawings.

First Embodiment

<Work Processing>

Figure 1:
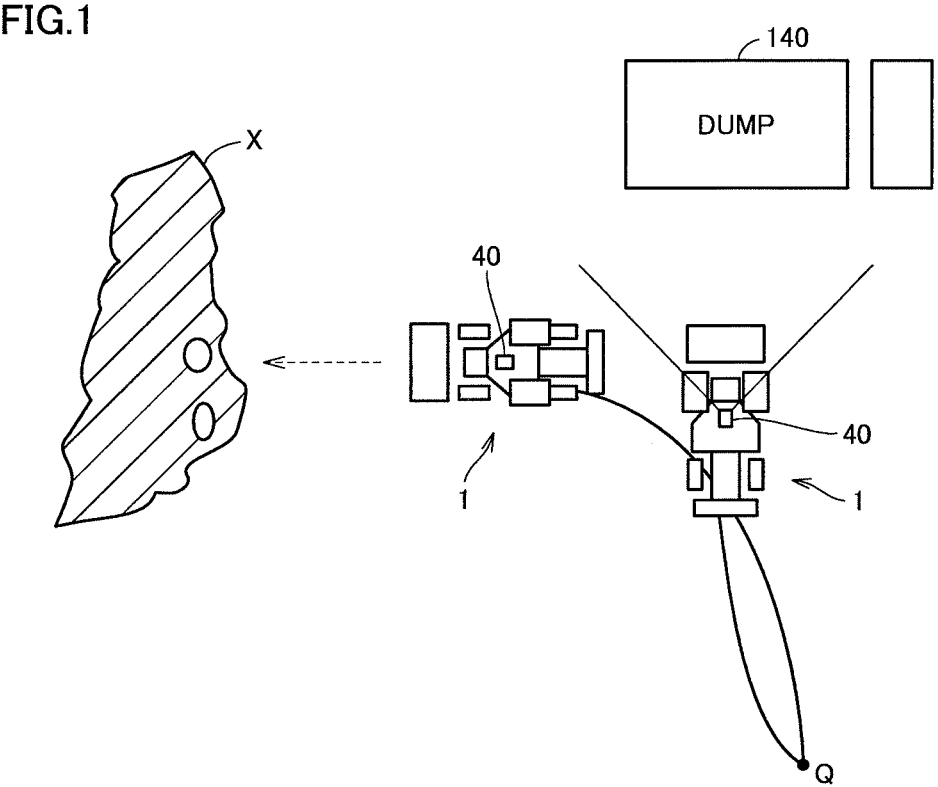
FIG. 1 illustrates overview of work processing based on a first embodiment.

FIG. 1 illustrates overview of work processing based on a first embodiment.

FIG. 1 shows a schematic configuration in which a work vehicle and a loaded vehicle are arranged at a work site such as a stone crush and a mine by way of example.

A loaded object X is shown at the work site.

A work vehicle 1 performs an excavation work for excavating loaded object X such as deposited soil and a loading work for loading the loaded object on a loaded vehicle 140.

Work vehicle 1 performs the excavation work for excavating loaded object X and thereafter moves rearward while it revolves to a point Q as facing loaded vehicle 140 (facing a side surface of loaded vehicle 140). The work vehicle moves forward from point Q toward a side surface of loaded vehicle 140 and performs the loading work for loading loaded object X on loaded vehicle 140. Loaded vehicle 140 is arranged at a position designated in advance such that the loading work by work vehicle 1 can efficiently be performed. A camera 40 is arranged on a roof side of work vehicle 1. Though one camera 40 is provided, a plurality of cameras are desirably arranged.

<Overall Configuration of Work Vehicle and Loaded Vehicle>

Figure 2:
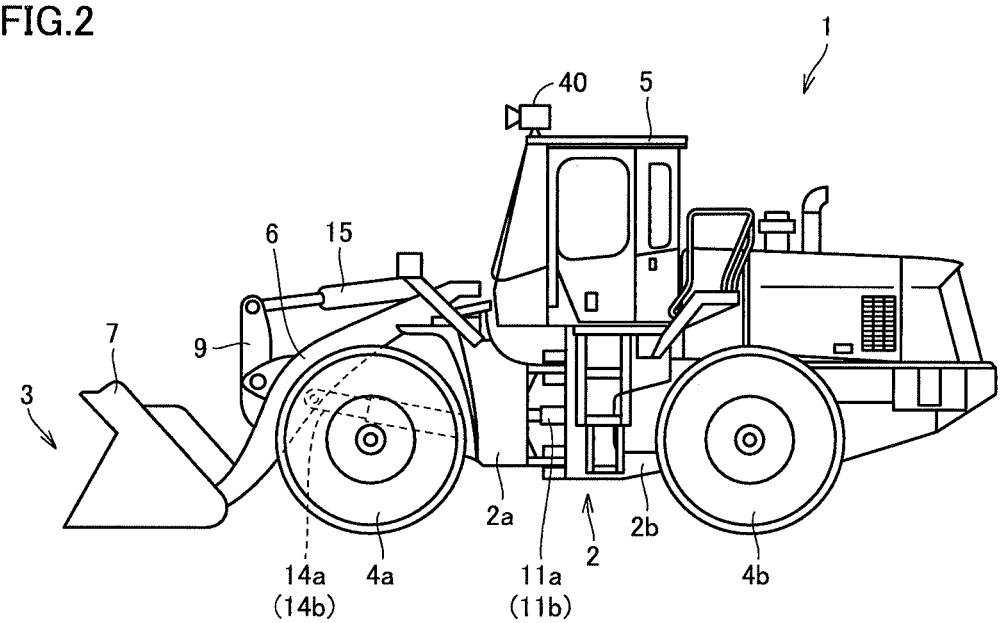
FIG. 2 shows appearance of a work vehicle 1 based on the first embodiment.

FIG. 2 shows appearance of work vehicle 1 based on the first embodiment.

In the present example, a wheel loader will be described by way of example of work vehicle 1.

Figure 3:
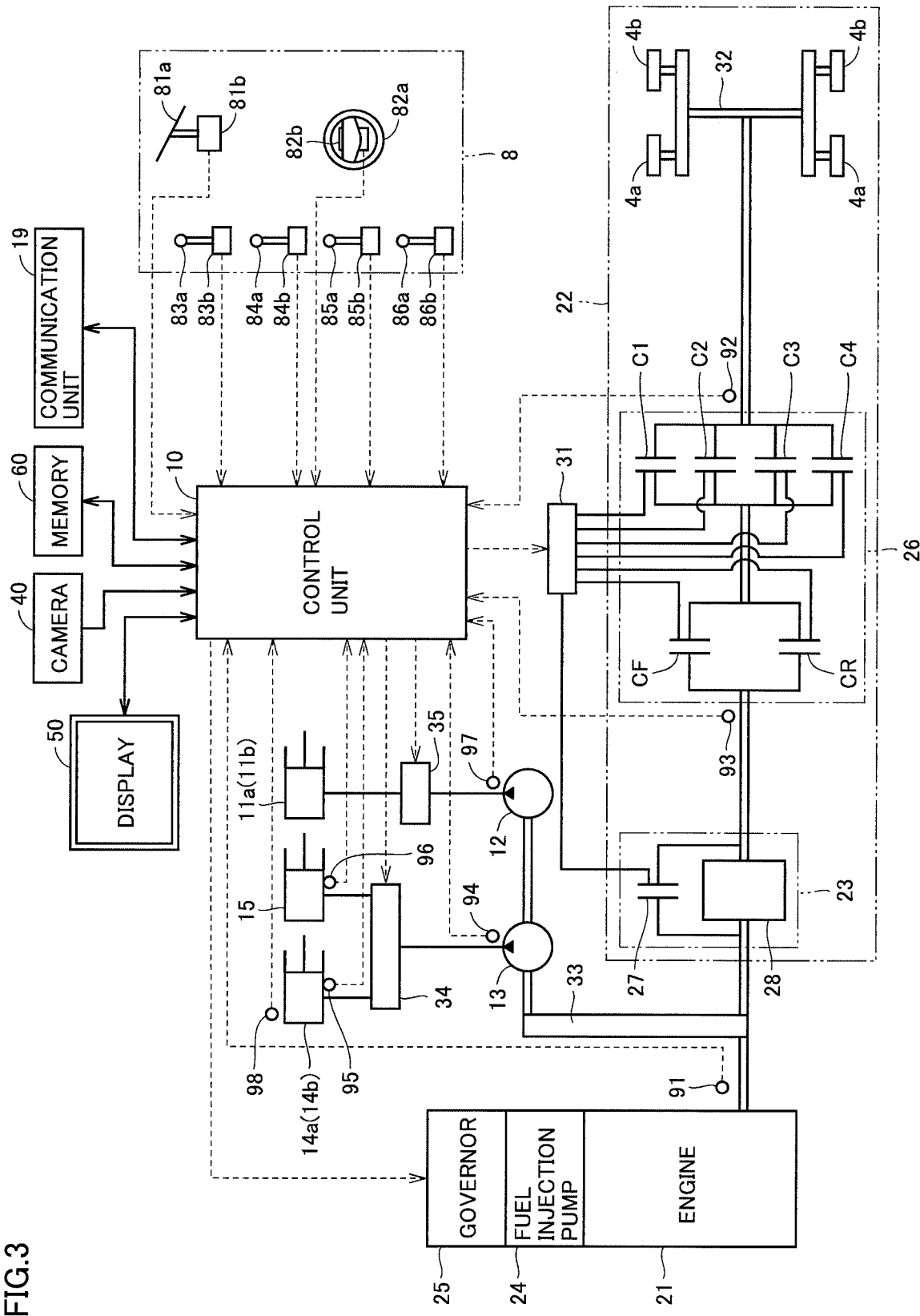
FIG. 3 is a schematic diagram showing a configuration of work vehicle 1 based on the first embodiment.

FIG. 3 is a schematic diagram showing a configuration of work vehicle 1 based on the first embodiment.

As shown in FIGS. 2 and 3, work vehicle 1 is mobile as wheels 4a and 4b are rotationally driven, and can perform a desired work with a work implement 3.

Work vehicle 1 includes a vehicular body frame 2, work implement 3, wheels 4a and 4b, and an operator's cab 5.

Vehicular body frame 2 has a front vehicular body portion 2a and a rear vehicular body portion 2b. Front vehicular body portion 2a and rear vehicular body portion 2b are coupled to each other in a manner swingable in a lateral direction.

A pair of steering cylinders 11a and 11b is provided across front vehicular body portion 2a and rear vehicular body portion 2b. Steering cylinders 11a and 11b are hydraulic cylinders driven by a hydraulic oil from a steering pump 12 (see FIG. 3). As steering cylinders 11a and 11b extend and contract, front vehicular body portion 2a swings with respect to rear vehicular body portion 2b. Thus, a direction of travel of the vehicle is changed.

FIGS. 2 and 3 show only one of steering cylinders 11a and 11b and do not show the other.

Work implement 3 and a pair of wheels 4a are attached to front vehicular body portion 2a. Work implement 3 is driven by the hydraulic oil from a work implement pump 13 (see FIG. 3). Work implement 3 includes a boom 6, a pair of lift cylinders 14a and 14b, a bucket 7, a bell crank 9, and a bucket cylinder 15.

Boom 6 is rotatably supported by front vehicular body portion 2a. Lift cylinders 14a and 14b have one ends attached to front vehicular body portion 2a. Lift cylinders 14a and 14b have the other ends attached to boom 6. As lift cylinders 14a and 14b extend and contract owing to the hydraulic oil from work implement pump 13, boom 6 vertically swings.

FIGS. 2 and 3 show only one of lift cylinders 14a and 14b and do not show the other.

Bucket 7 is rotatably supported at a tip end of boom 6. Bucket cylinder 15 has one end attached to front vehicular body portion 2a. Bucket cylinder 15 has the other end attached to bucket 7 with bell crank 9 being interposed. As bucket cylinder 15 extends and contracts owing to the hydraulic oil from work implement pump 13, bucket 7 vertically swings.

Operator's cab 5 and a pair of wheels 4b are attached to rear vehicular body portion 2b. Operator's cab 5 is placed on vehicular body frame 2 and a seat where an operator is seated and an operation portion 8 which will be described later are mounted inside.

As shown in FIG. 3, work vehicle 1 includes an engine 21 as a drive source, a traveling apparatus 22, work implement pump 13, steering pump 12, operation portion 8, and a control unit 10.

Engine 21 is a diesel engine and power of engine 21 is controlled by regulating an amount of fuel injected into a cylinder. Such regulation is achieved by control of an electronic governor 25 attached to a fuel injection pump 24 of engine 21 by control unit 10. Generally, an all speed control type governor is employed as governor 25, and an engine speed and an amount of fuel injection are regulated in accordance with a load such that an engine speed attains to a target speed in accordance with a position of an accelerator which will be described later. Governor 25 increases and decreases an amount of fuel injection such that there is no difference between a target speed and an actual engine speed. An engine speed is detected by an engine speed sensor 91. A detection signal from engine speed sensor 91 is input to control unit 10.

Traveling apparatus 22 is an apparatus for running a vehicle with drive force from engine 21. Traveling apparatus 22 includes a torque converter device 23, a transmission 26, and wheel 4a and wheel 4b described above.

Torque converter device 23 includes a lock-up clutch 27 and a torque converter 28. Lock-up clutch 27 can switch between a coupled state and a decoupled state. While lock-up clutch 27 is in the decoupled state, torque converter 28 transmits drive force from engine 21 with an oil serving as a medium. While lock-up clutch 27 is in the coupled state, an input side and an output side of torque converter 28 are directly coupled to each other. Lock-up clutch 27 is a hydraulically activated clutch and switching between the coupled state and the decoupled state is made by control of supply of the hydraulic oil to lock-up clutch 27 by control unit 10 with a clutch control valve 31 being interposed.

Transmission 26 includes a forward clutch CF corresponding to a forward drive gear and a reverse clutch CR corresponding to a reverse drive gear. With switching between a coupled state and a decoupled state of clutches CF and CR, switching between forward drive and reverse drive of the vehicle is made. While both of clutches CF and CR are in the decoupled state, the vehicle is in a neutral state. Transmission 26 includes a plurality of velocity stage clutches C1 to C4 corresponding to a plurality of velocity stages and can change a reduction gear ratio in a plurality of stages. For example, transmission 26 is provided with four velocity stage clutches C1 to C4 and the velocity stages can be switched among four stages from a first gear to a fourth gear. Each of velocity stage clutches C1 to C4 is a hydraulically activated hydraulic clutch. The hydraulic oil is supplied from a not-shown hydraulic pump through clutch control valve 31 to clutches C1 to C4. Clutch control valve 31 is controlled by control unit 10 to control supply of the hydraulic oil to clutches C1 to C4, so that switching between the coupled state and the decoupled state of each of clutches C1 to C4 is made.

An output shaft of transmission 26 is provided with a T/M output speed sensor 92 which detects a speed of the output shaft of transmission 26. A detection signal from T/M output speed sensor 92 is input to control unit 10. Control unit 10 calculates a vehicle speed based on a detection signal from T/M output speed sensor 92. Therefore, T/M output speed sensor 92 functions as a vehicle speed detection portion which detects a vehicle speed. A sensor which detects a rotation speed of other portions instead of the output shaft of transmission 26 may be employed as a vehicle speed sensor. Drive force output from transmission 26 is transmitted to wheels 4a and 4b through a shaft 32. The vehicle thus travels. A speed of an input shaft of transmission 26 is detected by a T/M input speed sensor 93. A detection signal from T/M input speed sensor 93 is input to control unit 10.

Some of drive force from engine 21 is transmitted to work implement pump 13 and steering pump 12 through a PTO shaft 33. Work implement pump 13 and steering pump 12 are hydraulic pumps driven by drive force from engine 21. The hydraulic oil delivered from work implement pump 13 is supplied to lift cylinders 14a and 14b and bucket cylinder 15 through a work implement control valve 34. The hydraulic oil delivered from steering pump 12 is supplied to steering cylinders 11a and 11b through a steering control valve 35. Thus, work implement 3 is driven by some of drive force from engine 21.

A pressure of the hydraulic oil delivered from work implement pump 13 is detected by a first hydraulic sensor 94. A pressure of the hydraulic oil supplied to lift cylinders 14a and 14b is detected by a second hydraulic sensor 95. Specifically, second hydraulic sensor 95 detects a hydraulic pressure in a cylinder bottom chamber to which the hydraulic oil is supplied when lift cylinders 14a and 14b extend. A pressure of the hydraulic oil supplied to bucket cylinder 15 is detected by a third hydraulic sensor 96. Specifically, third hydraulic sensor 96 detects a hydraulic pressure in a cylinder bottom chamber to which the hydraulic oil is supplied when bucket cylinder 15 extends. A pressure of the hydraulic oil delivered from steering pump 12 is detected by a fourth hydraulic sensor 97. Detection signals from first hydraulic sensor 94 to fourth hydraulic sensor 97 are input to control unit 10.

Operation portion 8 is operated by an operator. Operation portion 8 includes an accelerator operation member 81a, an accelerator operation detection device 81b, a steering operation member 82a, a steering operation detection device 82b, a boom operation member 83a, a boom operation detection device 83b, a bucket operation member 84a, a bucket operation detection device 84b, a transmission operation member 85a, a transmission operation detection device 85b, an FR operation member 86a, and an FR operation detection device 86b.

Accelerator operation member 81a is implemented, for example, by an accelerator pedal and operated in order to set a target speed of engine 21. Accelerator operation detection device 81b detects a position of accelerator operation member 81a. Accelerator operation detection device 81b outputs a detection signal to control unit 10. Steering operation member 82a is implemented, for example, by a steering wheel and operated in order to operate a direction of travel of a vehicle. Steering operation detection device 82b detects a position of steering operation member 82a and outputs a detection signal to control unit 10. Control unit 10 controls steering control valve 35 based on a detection signal from steering operation detection device 82b. Thus, steering cylinders 11a and 11b extend and contract and a direction of travel of the vehicle is changed.

Boom operation member 83a and bucket operation member 84a are implemented, for example, by an operation lever and operated in order to operate work implement 3. Specifically, boom operation member 83a is operated in order to operate boom 6. Bucket operation member 84a is operated in order to operate bucket 7. Boom operation detection device 83b detects a position of boom operation member 83a. Bucket operation detection device 84b detects a position of bucket operation member 84a. Boom operation detection device 83b and bucket operation detection device 84b output detection signals to control unit 10. Control unit 10 controls work implement control valve 34 based on detection signals from boom operation detection device 83*b* and bucket operation detection device 84*b*. Thus, lift cylinders 14*a* and 14*b* and bucket cylinder 15 extend and contract and boom 6 and bucket 7 operate. Work implement 3 is provided with a boom angle detection device 98 which detects a boom angle. A boom angle refers to an angle lying between a line connecting a rotation support center of front vehicular body portion 2*a* and boom 6 and a rotation support center of boom 6 and bucket 7 to each other and a line connecting axial centers of front and rear wheels 4*a* and 4*b* to each other. Boom angle detection device 98 outputs a detection signal to control unit 10. Control unit 10 calculates a height position of bucket 7 based on a boom angle detected by boom angle detection device 98. Therefore, boom angle detection device 98 functions as a height position detection portion which detects a height of bucket 7.

Transmission operation member 85*a* is implemented, for example, by a shift lever. Transmission operation member 85*a* is operated in order to set an upper limit of a velocity stage when an automatic transmission mode is selected. For example, when transmission operation member 85*a* is set to the third gear, transmission 26 is changed within a range from the second gear to the third gear and is not set to the fourth gear. When a manual transmission mode is selected, transmission 26 is changed to a velocity stage set with transmission operation member 85*a*. Transmission operation detection device 85*b* detects a position of transmission operation member 85*a*. Transmission operation detection device 85*b* outputs a detection signal to control unit 10. Control unit 10 controls speed change by transmission 26 based on a detection signal from transmission operation detection device 85*b*. Switching between the automatic transmission mode and the manual transmission mode is made by an operator with a not-shown transmission mode switching member.

FR operation member 86*a* is operated to switch between forward drive and reverse drive of the vehicle. FR operation member 86*a* can be set to each of a forward drive position, a neutral position, and a reverse drive position. FR operation detection device 86*b* detects a position of FR operation member 86*a*. FR operation detection device 86*b* outputs a detection signal to control unit 10. Control unit 10 controls clutch control valve 31 based on a detection signal from FR operation detection device 86*b*. Forward clutch CF and reverse clutch CR are thus controlled so that switching among forward drive, reverse drive, and the neutral state of the vehicle is made. Control unit 10 is generally implemented by reading of various programs by a central processing unit (CPU).

Control unit 10 is connected to a memory 60. Memory 60 functions as a work memory and stores various programs for implementing functions of the work vehicle.

Control unit 10 sends an engine command signal to governor 25 in order to obtain a target speed in accordance with a position of the accelerator.

Control unit 10 is connected to camera 40 and accepts input of image data picked up by camera 40. Camera 40 is provided on a roof side of operator's cab 5 of work vehicle 1. A direction of a line of sight of camera 40 is the same as a direction of line of sight of an operator who is seated at operator's cab 5 of work vehicle 1. The direction of line of sight is horizontal in the present example.

Control unit 10 is also connected to a display 50. Display 50 can show loading guidance to an operator, though description will be given later.

Control unit 10 is also connected to a communication unit 19 provided to be able to communicate with the outside.

Figure 4:
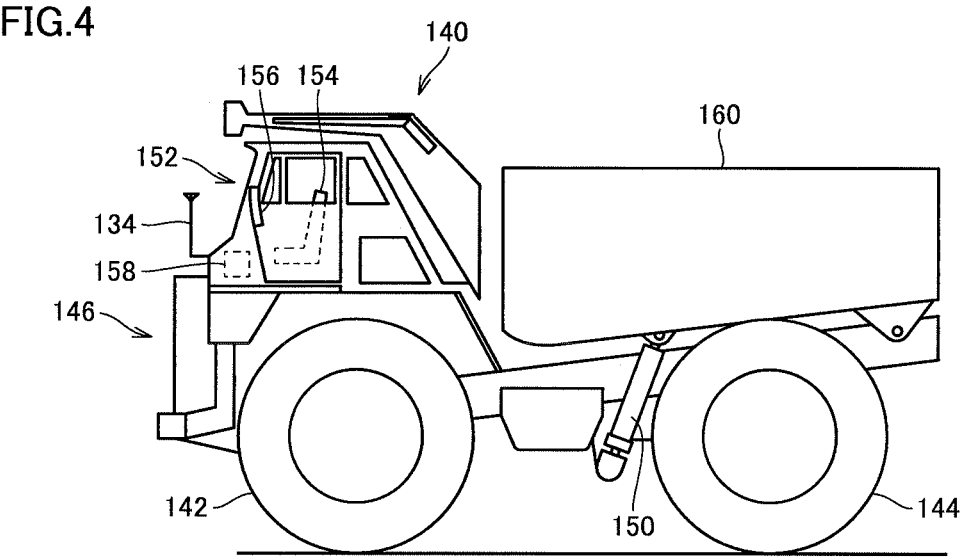
FIG. 4 shows appearance of a loaded vehicle 140 according to the first embodiment.

FIG. 4 shows appearance of loaded vehicle 140 according to the first embodiment.

FIG. 4 shows an example of a laterally viewed dump truck representing loaded vehicle 140.

Loaded vehicle 140 can be self-propelled, for example, as wheels 142 and 144 are rotationally driven. Loaded vehicle 140 includes an engine 146 such as a diesel engine as a drive source for driving wheels 142 and 144 and one or more of other components.

Loaded vehicle 140 includes a vessel 160 on which a loaded object such as soil can be loaded, an operator's cab 152, a control device 158, a communication device 134, and various actuators for operating various detectors and/or sensors and components.

Vessel 160 is operated to a soil ejection position, for example, with an actuator 150 being interposed.

Operator's cab 152 includes an operator's platform which is closed or partially closed, and includes a driver's seat 154, an operation portion (not shown), and a display 156.

Control device 158 accepts a result of detection by the detector and controls various actuators as necessary. Control device 158 includes a central processing unit (CPU), a memory, and various input and output peripherals.

Communication device 134 is connected to control device 158 and provided to be able to transmit and receive information through data communication with communication unit 19 of work vehicle 1.

<Control Configuration>

Figure 5:
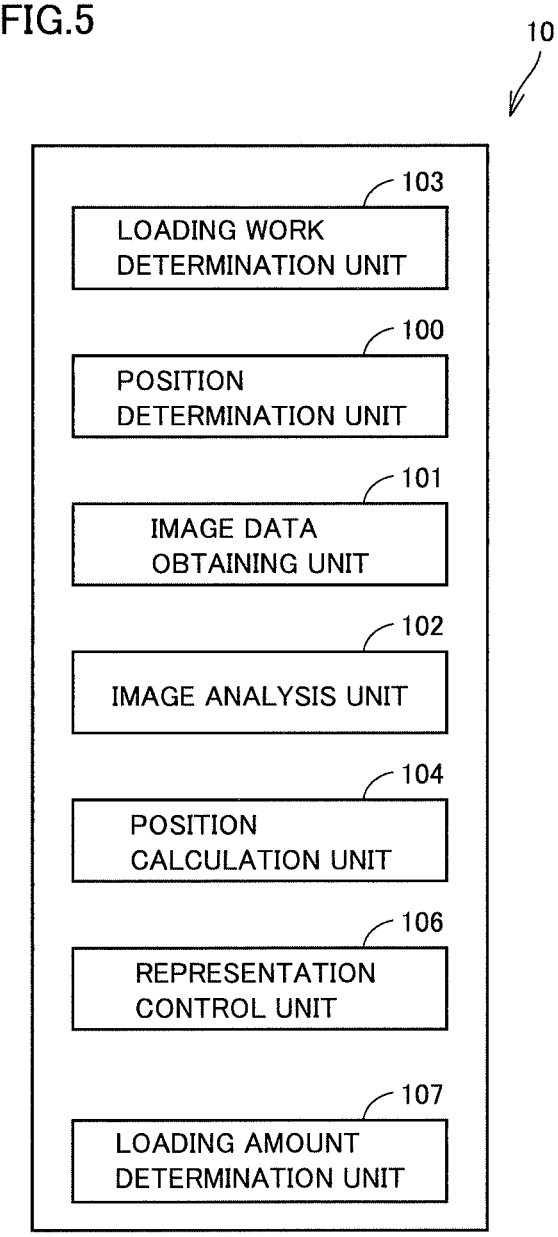
FIG. 5 illustrates a functional block of a control unit 10 of work vehicle 1 based on the first embodiment.

FIG. 5 illustrates a functional block of control unit 10 of work vehicle 1 based on the first embodiment.

As shown in FIG. 5, control unit 10 implements a functional block by executing various programs stored in memory 60. Specifically, control unit 10 includes a position determination unit 100, an image data obtaining unit 101, an image analysis unit 102, a loading work determination unit 103, a position calculation unit 104, a representation control unit 106, and a loading amount determination unit 107.

Position determination unit 100 determines a position of loading on loaded vehicle 140 based on a state of loading on loaded vehicle 140.

Image data obtaining unit 101 obtains image data picked up by camera 40.

Image analysis unit 102 analyzes the image data picked up by camera 40. Specifically, a laterally viewed loaded vehicle included in the image data is extracted. Image analysis unit 102 extracts a loaded region (vessel 160) from the extracted loaded vehicle.

Though a laterally viewed loaded vehicle is extracted in the present example, work vehicle 1 does not necessarily have to face loaded vehicle 140. So long as a laterally viewed loaded region can be extracted from image data resulting from image pick-up, any vertical height is acceptable regardless of whether or not the inside of vessel 160 can be seen.

Position calculation unit 104 calculates a position in the loaded vehicle on display 50 based on the laterally viewed loaded vehicle extracted by image analysis unit 102.

Representation control unit 106 has display 50 show loading guidance corresponding to the loading position determined by position determination unit 100 based on the position calculated by position calculation unit 104 for the laterally viewed loaded vehicle. Loading guidance is an indication with which an operator can visually recognize a loading position relative to the laterally viewed loaded vehicle.

Loading amount determination unit 107 calculates an amount of loading which can be achieved in one loading on vessel 160 of loaded vehicle 140 in an operation of work implement 3 of work vehicle 1, based on loaded object X and a capacity of bucket 7. Then, the loading amount determination unit calculates the number of times of loading based on the capacity of vessel 160 and the calculated amount of loading by bucket 7. For example, when vessel 160 has a capacity of 7 tons and bucket 7 has a capacity of 2.5 tons, the number of times of loading is calculated as 3 with first, second, and third amounts of loading being calculated as 2.4 tons, 2.3 tons, and 2.3 tons, respectively. The calculated number of times of loading is output to loading work determination unit 103 and that information is used. Information on the capacity of vessel 160 can be obtained from a model number of vessel 160 in advance, or information on a dimension can be obtained based on a result of analysis of a loaded region (vessel 160) by image analysis unit 102 so that a capacity of the vessel can be calculated based on the information on the dimension.

Loading work determination unit 103 determines whether or not a loading work has been performed. Loading work determination unit 103 determines whether or not a loading work has been performed based on processing of an operation onto operation portion 8 of work vehicle 1. By way of example, when bucket 7 is located at a position equal to or higher than a prescribed height and bucket 7 performs a prescribed soil ejection operation (an operation to eject loaded object X) in response to an operation instruction for boom operation member 83*a* and bucket operation member 84*a* as operation portion 8, it is determined that a work for loading loaded object X has been performed. When loading work determination unit 103 determines that the loading work has been performed, it counts up the number of times of loading work. The counted number of times of loading work is saved in memory 60. The number of times of loading is counted up until the calculated number of times of loading described above is reached. For example, in an initial state, the number of times of loading work is set to "0".

Figure 6:
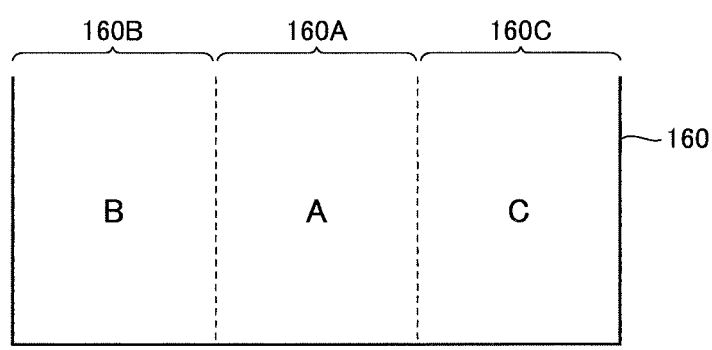
FIG. 6 illustrates division of a region in a vessel 160 based on the first embodiment.

FIG. 6 illustrates division of a region in vessel 160 based on the first embodiment.

As shown in FIG. 6, by way of example, in a side view (a view from a side) of vessel 160, the vessel is divided into three regions of A to C regions 160A to 160C. A to C regions 160A to 160C correspond to central, left (a front portion of the dump truck), and right (a rear portion of the dump truck) regions, respectively.

In the present example, loaded object X is loaded sequentially on each region in vessel 160.

By way of example, a loading work for loading loaded object X on a position in the A region→the B region→the C region is performed.

Specifically, by way of example, the number of times of loading work and a loading position are associated with each other. For example, when the number of times of loading work saved in memory 60 is 0 (a first loading work), loaded object X is loaded on a position in the A region. When the number of times of loading work saved in memory 60 is 1 (a second loading work), loaded object X is loaded on a position in the B region. When the number of times of loading work saved in memory 60 is 2 (a third loading work), loaded object X is loaded on a position in the C region. When the number of times of loading work saved in memory 60 is 3 (a fourth loading work), loaded object X is loaded again on a position in the A region. Subsequent processing is the same. By sequentially changing a loading position, loaded object X is carried as being distributed. Load balance of loaded object X in loaded vehicle 140 can thus be uniform.

Position determination unit 100 determines any of the A region to the C region as a next position of loading on loaded vehicle 140. For example, when the number of times of loading work stored in memory 60 is "0", the A region is determined as the loading position.

When loading work determination unit 103 determines that the work for loading on the A region has been completed, it counts up the number of times of loading work to "1".

Position determination unit 100 determines any of the A region to the C region as a next position of loading on loaded vehicle 140. For example, when the number of times of loading work stored in memory 60 is "1", the B region is determined as the loading position.

When loading work determination unit 103 determines that the work for loading on the B region has been completed, it counts up the number of times of loading work to "2".

Position determination unit 100 determines any of the A region to the C region as a next position of loading on loaded vehicle 140. For example, when the number of times of loading work stored in memory 60 is "2", the C region is determined as the loading position.

Figure 7:
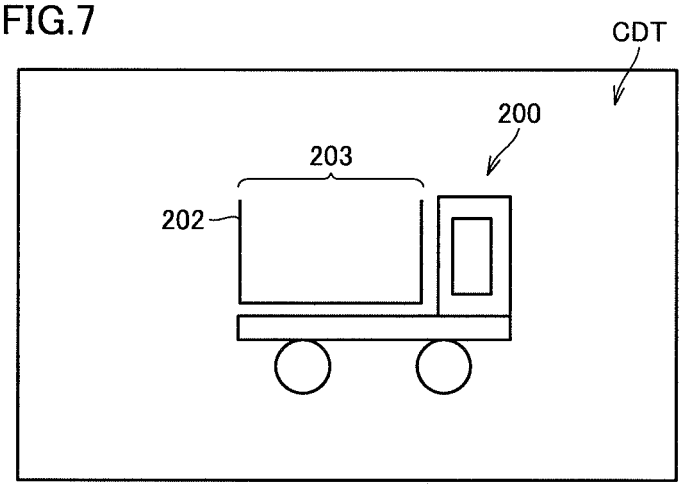
FIG. 7 illustrates image data picked up by a camera 40 based on the first embodiment.

FIG. 7 illustrates image data picked up by camera 40 based on the first embodiment.

FIG. 7 shows image data CDT picked up by camera 40. The image data includes a dump truck 200 resulting from image pick-up of loaded vehicle 140.

Dump truck 200 includes a vessel 202. A loaded region 203 is shown in a direction of length of vessel 202.

As described above, image analysis unit 102 extracts a loaded vehicle included in image data CDT. Image analysis unit 102 extracts loaded region 203 from the extracted loaded vehicle. There are various schemes for extraction and extraction through pattern matching is performed by way of example. For the sake of brevity of description, image analysis unit 102 extracts loaded region 203 in the loaded vehicle included in image data CDT through pattern matching. In extraction, however, loaded region 203 not only in a fore-aft direction (a direction of length) of dump truck 200 but also in a lateral direction (a direction of width) and a direction of depth of dump truck 200 is extracted. Image analysis unit 102 analyzes and recognizes a capacity of the vessel based on extracted loaded region 203 in the directions of length, width, and depth.

Position calculation unit 104 calculates a position of loaded region 203 in the loaded vehicle shown on display 50 based on the loaded vehicle extracted by image analysis unit 102. Position calculation unit 104 calculates as a loading position, a prescribed position defined by division of extracted loaded region 203 into three parts in the direction of length, which corresponds to the position determined by position determination unit 100.

Figure 8:
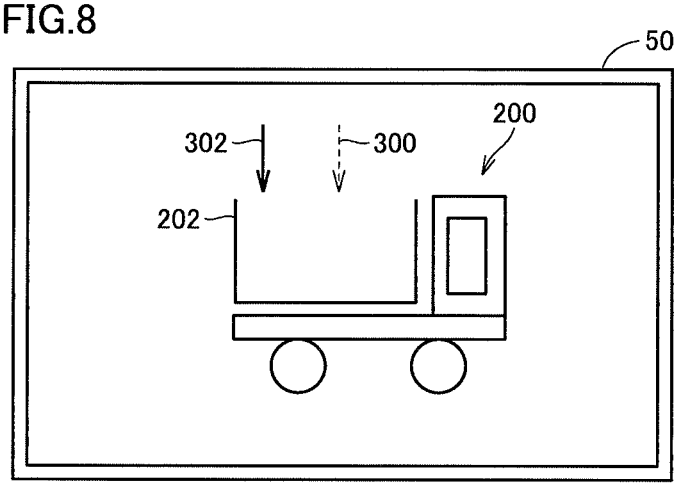
FIG. 8 illustrates loading guidance given by a representation control unit 106 based on the first embodiment.

FIG. 8 illustrates loading guidance given by representation control unit 106 based on the first embodiment.

As shown in FIG. 8, display 50 shows loading guidance 300 corresponding to a previous position of loading on dump truck 200. Loading guidance 302 corresponding to a next position of loading on dump truck 200 is shown.

Representation control unit 106 has display 50 show loading guidance corresponding to the loading position determined by position determination unit 100 based on the loading position calculated by position calculation unit 104 for the laterally viewed loaded vehicle.

For example, when position determination unit 100 determines the B region as the loading position, representation control unit 106 has display 50 show image data as being synthesized with loading guidance indicative of a prescribed position (left) defined by division of extracted loaded region 203 into three parts in the direction of length.

Positions are shown with arrows as examples of loading guidance 300 and 302. Loading guidance 302 is shown with a solid arrow. Loading guidance 300 is shown with a dotted arrow. By using an arrow as the indication, a position can intuitively be recognized and an intuitive loading work can be performed.

Though the arrow is used as the indication of a position by way of example of loading guidance 300 and 302 in the present example, the indication is not limited to the arrow and an indication in any form may be applicable so long as a loading position can visually be recognized with the indication. A position can also be indicated with a message as loading guidance. With loading guidance, a loading position can readily be recognized and an efficient loading work can be performed.

An operator can thus perform a work for loading loaded object X on a determined position in laterally viewed loaded vehicle 140 by operating operation portion 8 while the operator looks at loading guidance 300 and 302 shown on display 50. In this case, since the operator recognizes loading guidance shown for laterally viewed loaded vehicle 140 on display 50, the operator can perform an intuitive loading work.

Though a plurality of pieces of loading guidance 300 and 302 are shown in the present example, any one of them can be shown.

For example, when only previous loading guidance 300 is shown on display 50, the operator of work vehicle 1 can readily recognize the previous loading position. The operator can thus perform a work for loading loaded object X on a region other than the previous loading position while the operator looks at loading guidance 300.

When next loading guidance 302 is shown on display 50, the operator of work vehicle 1 can readily recognize the next loading position. The operator can thus perform a work for loading loaded object X on the position while the operator looks at loading guidance 302.

Figure 9:
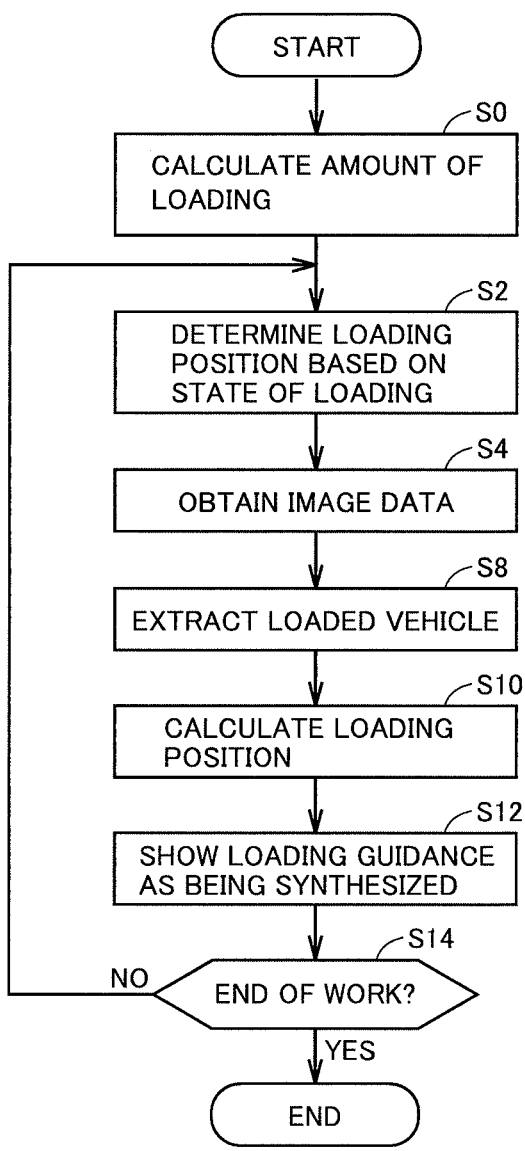
FIG. 9 is a flowchart illustrating processing for representation of loading guidance by control unit 10 based on the first embodiment.

FIG. 9 is a flowchart illustrating processing for representation of loading guidance by control unit 10 based on the first embodiment.

As shown in FIG. 9, control unit 10 calculates an amount of loading (step S0). Specifically, loading amount determination unit 107 calculates an amount of loading achieved by one loading on vessel 160 of loaded vehicle 140 in an operation of work implement 3 of work vehicle 1 based on loaded object X and a capacity of bucket 7. The number of times of loading is calculated based on the capacity of vessel 160 and the calculated amount of loading by bucket 7.

Control unit 10 determines a loading position based on a state of loading (step S2).

Specifically, position determination unit 100 determines a position of loading on loaded vehicle 140 based on a previous state of loading on loaded vehicle 140. Position determination unit 100 determines a loading position based on the number of times of loading work saved in memory 60. For example, when the number of times of loading work is "1", determination as the B region is made. By determining a next loading position based on the previous state of loading, loaded object X can be loaded on the loaded vehicle as being distributed and an efficient loading work can be performed.

Control unit 10 obtains image data (step S4). Specifically, image data obtaining unit 101 obtains image data picked up by camera 40.

Control unit 10 extracts a loaded vehicle (step S8). Specifically, image analysis unit 102 analyzes the image data obtained by image data obtaining unit 101 and extracts a loaded region (vessel 160) from the laterally viewed loaded vehicle.

Control unit 10 calculates a loading position (step S10). Specifically, position calculation unit 104 calculates a loading position based on loaded region 203 extracted by image analysis unit 102. For example, a prescribed position defined by division of extracted loaded region 203 into three parts in the direction of length, which corresponds to the position determined by position determination unit 100, is calculated as the loading position.

Control unit 10 has loading guidance shown as being synthesized (step S12). Representation control unit 106 has the display show loading guidance corresponding to the loading position determined by position determination unit 100 based on the position calculated by position calculation unit 104 for the laterally viewed loaded vehicle.

For example, when position determination unit 100 determines the B region as the loading position, representation control unit 106 has display 50 show image data as being synthesized with loading guidance for a prescribed position (left) defined by division of extracted loaded region 203 into three parts in the direction of length.

Control unit 10 determines whether or not to quit the work (step S14). Control unit 10 determines whether or not an operation onto operation portion 8 has ended.

When control unit 10 determines in step S14 to quit the work (YES in step S14), the process ends.

When control unit 10 determines in step S14 not to quit the work (NO in step S14), the process returns to step S2 and the process above is repeated.

Specifically, when it is determined that an operation onto operation portion 8 has not ended, the process continues.

When the loading work is performed in response to an operation onto operation portion 8, loading work determination unit 103 counts up the number of times of loading work as described above. The state of loading is thus varied.

Control unit 10 repeats the processing for determining a loading position based on the varied state of loading in step S2. Specifically, the number of times of loading work is counted up until the calculated number of times of loading is reached, and the process above is repeated.

When the loading work is performed as calculated, the number of times of loading work is counted up until the calculated number of times of loading is reached. An amount of one loading, however, may be different from a value calculated as a state of loading. For example, an amount of loading by bucket 7 may be monitored with a sensor and the amount of loading may be different from a value for the calculated amount of loading.

For example, when an actual amount of loading in the first loading work is smaller than an aimed amount of first loading calculated before the loading work, an aimed amount of second loading is corrected to a value greater than the aimed amount of second loading calculated before the first loading work. In this case, the second loading position may be corrected. Specifically, when loading on the B region is initially performed and then loading on the A region is performed, loading guidance may be shown so as to correct the loading position from the initial position of loading in the A region to a position closer to the B region and then perform the loading work. An amount of loading can thus be distributed by loading loaded object X also on the position closer to the B region. When an amount of loading in the initial loading work is greater than the calculated value, an amount of loading in the next loading work can be calculated as an amount smaller than the initially calculated amount of loading. In this case, loading guidance may be shown so as to change the next loading position from the initial position of loading in the A region to a position closer to a side opposite to the B region (closer to the C region) and then perform the loading work. Processing for changing a loading position can be performed continually during the loading work. Information on an amount of loading may be shown as loading guidance together with a loading position.

When an amount of one loading as a state of loading is different from the calculated value, the calculated number of times of loading may be increased or decreased. Specifically, when an amount of loading by bucket 7 is greater than the calculated amount of loading, the number of times of loading may be decreased. In contrast, when the amount of loading by bucket 7 is smaller than the calculated amount of loading, the number of times of loading may be increased. Processing for correcting the number of times of loading can be performed continually during the loading work.

Though control unit 10 provided in work vehicle 1 controls representation of loading guidance in the present example, whole processing can also be performed by a control system in coordination with other apparatuses instead of control unit 10 performing whole processing.

Modification

In the first embodiment, work vehicle 1 recognizes a state of loading on loaded vehicle 140 by counting the number of times of loading.

In a modification of the present first embodiment, work vehicle 1 recognizes a state of loading on loaded vehicle 140 through data communication from loaded vehicle 140.

In the modification of the present first embodiment, loaded vehicle 140 communicates data with work vehicle 1 through communication device 134. Specifically, control device 158 of loaded vehicle 140 transmits information on a state of loading to work vehicle 1 through communication device 134 based on information from a detector and/or a sensor for sensing a condition of loading provided in vessel 160. For example, a detector for sensing a condition of loading is provided in each of A to C regions 160A to 160C in vessel 160. Control device 158 detects at which position a loading work has been performed based on information from the detector provided in each region and transmits a result of detection to work vehicle 1 as information on the state of loading.

Figure 10:
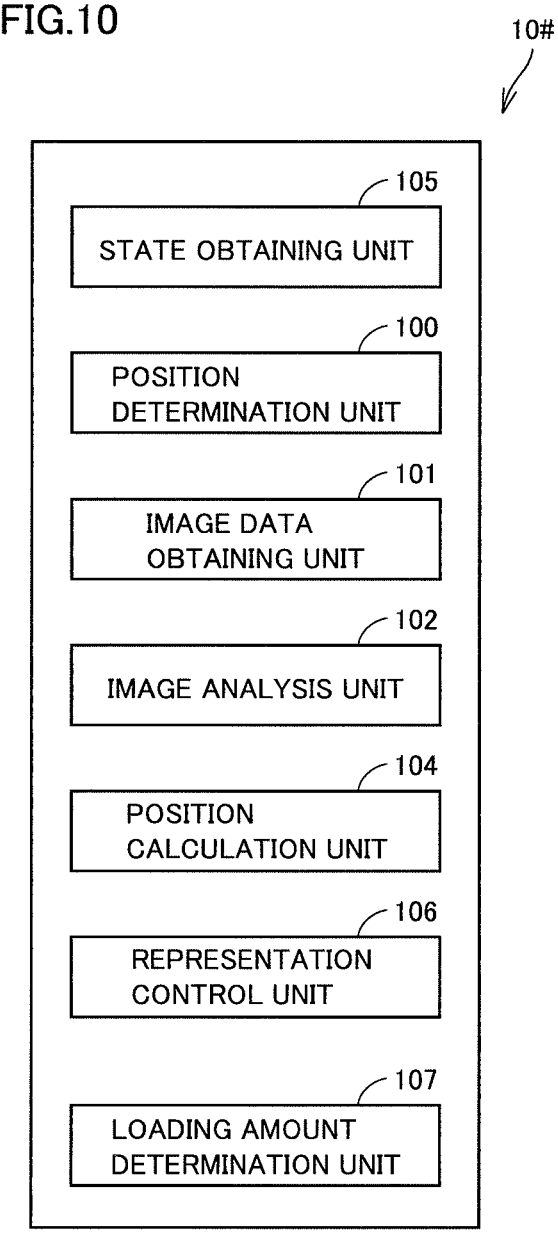
FIG. 10 illustrates a functional block of a control unit 10# based on a modification of the first embodiment.

FIG. 10 illustrates a functional block of a control unit 10# based on the modification of the first embodiment.

As shown in FIG. 10, control unit 10# is different from control unit 10 in FIG. 5 in that a state obtaining unit 105 is provided instead of loading work determination unit 103. Since the control unit is otherwise the same, detailed description thereof will not be repeated.

State obtaining unit 105 obtains information on a state of loading (loading state data) through data communication from loaded vehicle 140. For example, state obtaining unit 105 obtains information to the effect that a work for loading on A region 160A has been performed through data communication from loaded vehicle 140.

Position determination unit 100 determines a position of loading on loaded vehicle 140 based on a state of loading on loaded vehicle 140. For example, when state obtaining unit 105 obtains information on a state of loading to the effect that a work for loading on A region 160A has been performed, position determination unit 100 determines any of the A region to the C region as a next position of loading on loaded vehicle 140. For example, position determination unit 100 determines the B region as the next position of loading on loaded vehicle 140.

Since the processing is otherwise the same as described in the first embodiment, detailed description thereof will not be repeated.

With such a scheme, a loading position can be determined based on information on a state of loading from loaded vehicle 140 and an efficient loading work in accordance with an actual state of loading on loaded vehicle 140 can be performed.

Though a loading work is performed sequentially from the A region to the C region as loading positions, the order of loading is not particularly limited as such. For example, after loading on the A region is performed a prescribed number of times, a work for loading on the B region and the C region may be performed, and the order is not particularly limited either. For example, the number of times (a prescribed number of times) of loading on each of the A to C regions is calculated based on a capacity of vessel 160 and a calculated amount of loading by bucket 7. The calculated number of times of loading is output to loading work determination unit 103 and that information is used.

When the loading work is performed as calculated, the number of times of loading work is counted up until the calculated number of times (a prescribed number of times) of loading is reached. An amount of one loading as a state of loading, however, may be different from the calculated value. For example, when an amount of loading is monitored with a sensor for sensing an amount of loading provided in each of A to C regions 160A to 160C in vessel 160 and it is determined that loading on the A to C regions in vessel 160 is not in good balance, a next loading position may be changed among the A, B, and C regions. Alternatively, loading guidance may be shown to perform a loading work with a loading position being changed to a position located between the A region and the B region and a position located between the B region and the C region. Processing for changing a loading position can be performed continually during the loading work. Alternatively, when an amount of loading by bucket 7 is greater than the calculated amount of loading, the number of times of loading may be decreased. In contrast, when an amount of loading by bucket 7 is smaller than the calculated amount of loading, the number of times of loading may be increased. Processing for correcting the number of times of loading can be performed continually during the loading work.

Second Embodiment

In the first embodiment, loading guidance for a laterally viewed loaded vehicle, of which image has been picked up, is shown as being synthesized with a camera image.

In the present second embodiment, loading guidance is shown for a loaded vehicle viewed by an operator.

A configuration of control unit 10 is the same as in the first embodiment.

Figure 11:
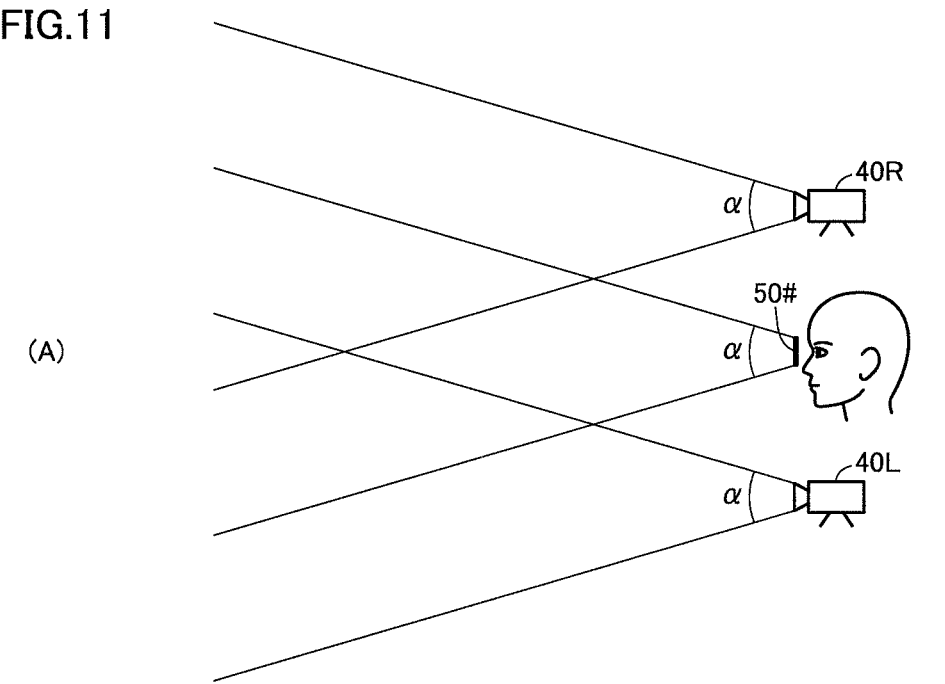
FIG. 11 illustrates a scheme for showing loading guidance based on a second embodiment.
Figure 11:
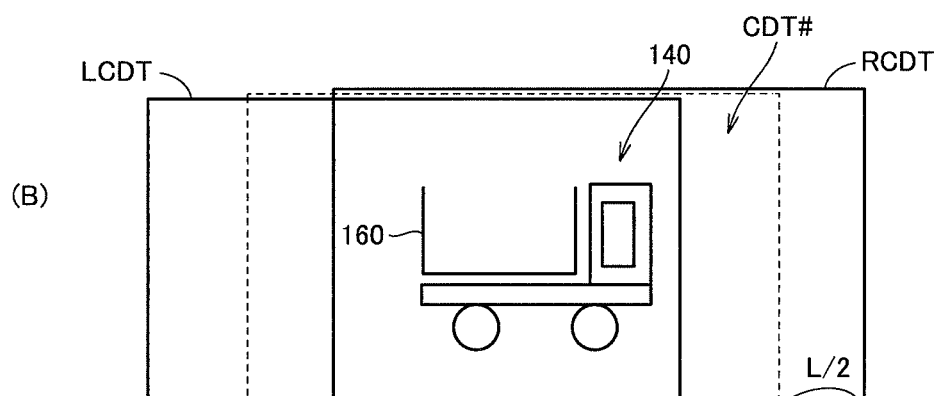
Figure 11:
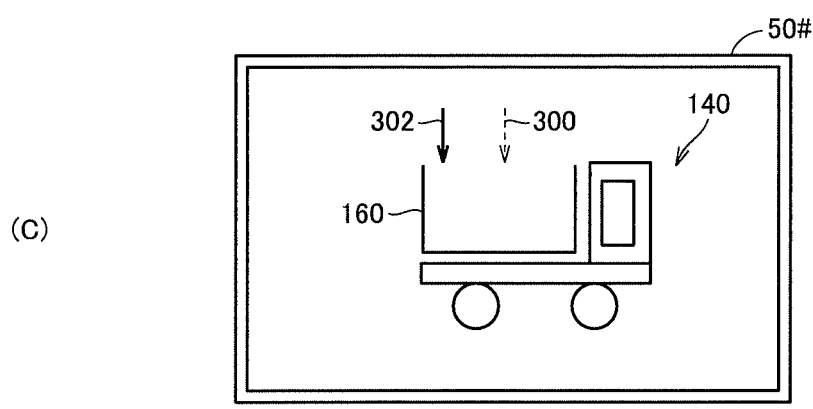

FIG. 11 illustrates a scheme for showing loading guidance based on the second embodiment.

FIG. 11 (A) shows that cameras 40L and 40R are provided on the left and right of a display 50#, respectively. The cameras are provided at an equal distance.

Optically transparent (see-through) display 50# is provided in front of an operator. The operator can obtain external information through display 50#.

The present example shows a vertical image pick-up range a from which the operator obtains information through display 50# by way of example.

The vertical image pick-up ranges of cameras 40R and 40L are also set to be identical.

Though not shown in the present example, a horizontal image pick-up range from which the operator obtains information through display 50# and a horizontal image pick-up range of cameras 40R and 40L are also set to be identical.

In the present example, by way of example, display 50# is provided as being fixed to work vehicle 1, and positions of display 50# and cameras 40R and 40L with respect to the horizontal plane are set to be identical in height.

FIG. 11 (B) illustrates a scheme of extraction of information obtained by the operator through display 50# from image data of the image pick-up range of camera 40.

FIG. 11 (B) shows image data RCDT from right camera 40R and image data LCDT on the left. Image data RCDT and image data LCDT are arranged such that any identical points are superimposed on each other. The loaded vehicle is shown in both of them. When image data RCDT and image data LCDT are displaced in a horizontal direction by a length L, the range from which the operator obtains information through display 50# results from displacement of image data RCDT by L/2 to the left and displacement of image data LCDT by L/2 to the right. In the present example, information on the range obtained by the operator through display 50# is extracted as image data CDT #.

As shown in FIG. 11 (C), display 50# shows loading guidance 300 corresponding to a previous position of loading on loaded vehicle 140. Loading guidance 302 corresponding to a next position of loading on loaded vehicle 140 is shown. Loaded vehicle 140 indicated on display 50# is watched by the operator through see-through display 50# and not shown on display 50#.

Image analysis unit 102 based on the second embodiment extracts a loaded vehicle included in image data CDT # as described above. Image analysis unit 102 extracts loaded region 203 from the extracted loaded vehicle. There are various schemes for extraction and extraction through pattern matching is performed by way of example.

Position calculation unit 104 calculates a position of loaded region 203 in loaded vehicle 140 based on the loaded vehicle extracted by image analysis unit 102. Position calculation unit 104 calculates as a loading position, a prescribed position defined by division of extracted loaded region 203 into three parts in the direction of length, which corresponds to the position determined by position determination unit 100.

Representation control unit 106 has display 50# show loading guidance corresponding to the loading position determined by position determination unit 100 based on the position calculated by position calculation unit 104 for the loaded vehicle.

An operator can thus perform a work for loading loaded object X on the determined position in loaded vehicle 140 by operating operation portion 8 while the operator looks at loading guidance 300 and 302 shown on display 50#. In this case, since the operator recognizes loading guidance shown for laterally viewed loaded vehicle 140 on display 50#, the operator can perform an intuitive loading work.

Though a plurality of pieces of loading guidance 300 and 302 are shown in the present example, any one of them can be shown.

For example, when only previous loading guidance 300 is shown on display 50#, the operator of work vehicle 1 can readily recognize the previous loading position. The operator can thus perform a work for loading loaded object X on a region other than the previous loading position by operating operation portion 8 while the operator looks at loading guidance 300.

When next loading guidance 302 is shown on display 50#, the operator of work vehicle 1 can readily recognize the next loading position. The operator can thus perform a work for loading loaded object X on that position by operating operation portion 8 while the operator looks at loading guidance 302.

Since the operator can obtain information on the loaded vehicle and loading guidance through display 50# located in front of the operator, the operator can perform a loading work without looking away from the loaded vehicle and can perform an efficient loading work.

Figure 12:
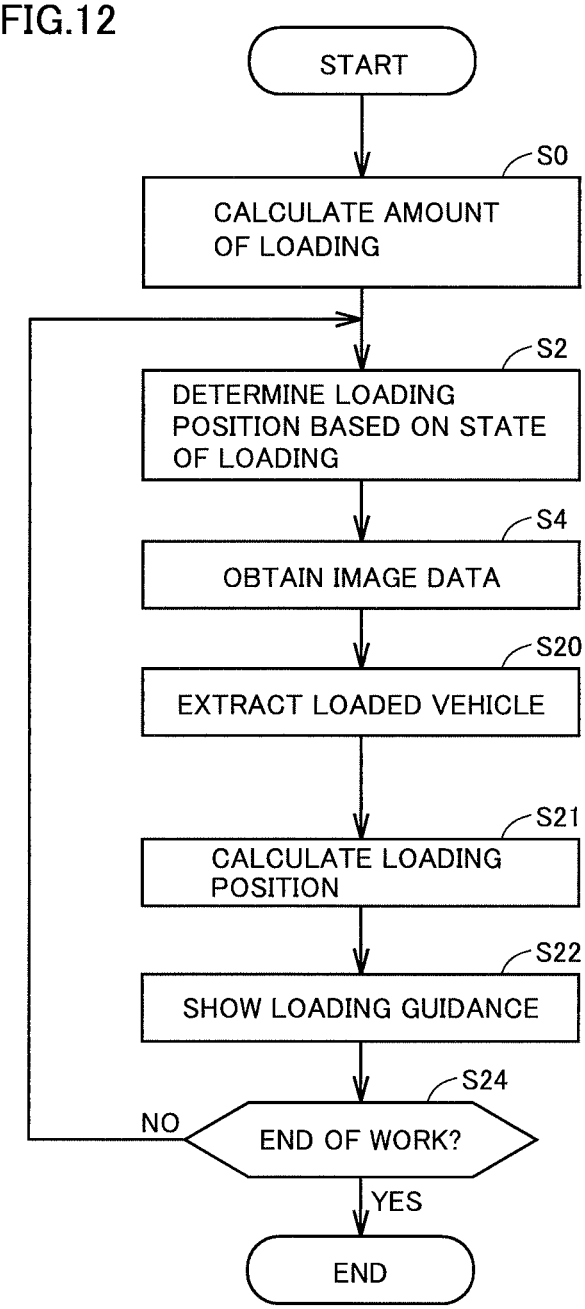
FIG. 12 is a flowchart illustrating processing for showing loading guidance based on the second embodiment.

FIG. 12 is a flowchart illustrating processing for showing loading guidance based on the second embodiment.

As shown in FIG. 12, control unit 10 calculates an amount of loading (step S0). Specifically, loading amount determination unit 107 calculates an amount of loading achieved by one loading on vessel 160 of loaded vehicle 140 in an operation of work implement 3 of work vehicle 1 based on loaded object X and a capacity of bucket 7. The number of times of loading is calculated based on the capacity of vessel 160 and the calculated amount of loading by bucket 7.

Control unit 10 determines a loading position based on a state of loading (step S2).

Specifically, position determination unit 100 determines a position of loading on loaded vehicle 140 based on the state of loading on loaded vehicle 140. Position determination unit 100 determines a loading position based on the number of times of loading work saved in memory 60. For example, when the number of times of loading work is "1", determination as the B region is made.

Control unit 10 obtains image data (step S4). Specifically, image data obtaining unit 101 obtains image data RCDT and LCDT picked up by cameras 40R and 40L. Image data CDT # on a range from which an operator obtains information through display 50# is obtained based on image data RCDT and LCDT.

Control unit 10 extracts a loaded vehicle (step S20). Specifically, image analysis unit 102 analyzes image data CDT # obtained by image data obtaining unit 101 and extracts a loaded region (vessel 160) from the laterally viewed loaded vehicle.

Control unit 10 calculates a loading position (step S21). Specifically, position calculation unit 104 calculates a position of loading on the loaded vehicle on the display based on loaded region 203 extracted by image analysis unit 102. For example, a prescribed position defined by division of extracted loaded region 203 into three parts in the direction of length, which corresponds to the position determined by position determination unit 100, is calculated as the loading position.

Control unit 10 has loading guidance shown (step S22). Representation control unit 106 has the display show loading guidance corresponding to the loading position determined by position determination unit 100 based on the position calculated by position calculation unit 104 for the loaded vehicle.

For example, when position determination unit 100 determines the B region as the loading position, representation control unit 106 has display 50 show loading guidance for a prescribed position (left) defined by division of extracted loaded region 203 into three parts in the direction of length for loaded vehicle 140.

Control unit 10 determines whether or not to quit the work (step S24). Control unit 10 determines whether or not an operation onto operation portion 8 has ended.

When control unit 10 determines in step S24 to quit the work (YES in step S24), the process ends.

When control unit 10 determines in step S24 not to quit the work (NO in step S24), the process returns to step S2 and the process above is repeated.

Specifically, when it is determined that an operation onto operation portion 8 has not ended, the process continues.

When the loading work is performed in response to an operation onto operation portion 8, loading work determination unit 103 counts up the number of times of loading work as described above. The state of loading is thus varied.

Control unit 10 repeats the processing for determining a loading position based on the varied state of loading in step S2. Specifically, the number of times of loading work is counted up until the calculated number of times of loading is reached, and the process above is repeated.

When the loading work is performed as calculated, the number of times of loading work is counted up until the calculated number of times of loading is reached. An amount of one loading as a state of loading, however, may be different from the calculated value. For example, when an amount of loading by bucket 7 is monitored with a sensor and it is different from a value for the calculated amount of loading, the calculated number of times of loading may be increased or decreased. Specifically, when an amount of loading by bucket 7 is greater than the calculated amount of loading, the number of times of loading may be decreased. In contrast, when the amount of loading by bucket 7 is smaller than the calculated amount of loading, the number of times of loading may be increased. Processing for correcting the number of times of loading can be performed continually during the loading work.

Though display 50# is fixed to work vehicle 1 in the present example, a height thereof may be adjusted. For example, cameras 40R and 40L may be adjusted to the same height in accordance with a height of display 50#.

A direction of line of sight of visual recognition by the operator through display 50# may also be adjustable. Directions of lines of sight of cameras 40R and 40L may also be adjusted in accordance with an orientation of display 50#.

Though a configuration including two cameras 40R and 40L is described in the present example, the configuration may be implemented by at least one camera. In that case, an image pick-up range of the camera includes a range from which the operator obtains information through display 50# and the range is extracted with image analysis processing.

Though display 50# is fixed to work vehicle 1 in the present example, limitation thereto is not particularly intended and a display may be in a form wearable by an operator like what is called a head mounted display.

(Other Forms)

Though control unit 10 of work vehicle 1 performs main processing for showing loading guidance in the embodiments, work vehicle 1 does not necessarily have to include each functional block of control unit 10. Some functional blocks may be provided in a server connected to a network or provided on a side of a loaded vehicle which can communicate data.

Though embodiments of the present invention have been described above, it should be understood that the embodiments disclosed herein are illustrative and non-restrictive in every respect. The scope of the present invention is defined by the terms of the claims and is intended to include any modifications within the scope and meaning equivalent to the terms of the claims.

REFERENCE SIGNS LIST 1 work vehicle; 2 vehicular body frame; 2a front vehicular body portion; 2b rear vehicular body portion; 3 work implement; 4a, 4b, 142, 144 wheel; 5, 152 operator's cab; 6 boom; 7 bucket; 8 operation portion; 9 bell crank; 10 control unit; 11a, 11b steering cylinder; 12 steering pump; 13 work implement pump; 14a, 14b lift cylinder; 15 bucket cylinder; 19 communication unit; 21, 146 engine; 22 traveling apparatus; 23 torque converter device; 24 fuel injection pump; 26 transmission; 27 lock-up clutch; 28 torque converter; 31 clutch control valve; 32 shaft; 33 shaft; 34 work implement control valve; 35 steering control valve; 40, 40L, 40R camera; 50, 50# display; 60 memory; 81a accelerator operation member; 81b accelerator operation detection device; 82a steering operation member; 82b steering operation detection device; 83a boom operation member; 83b boom operation detection device; 84a bucket operation member; 84b bucket operation detection device; 85a transmission operation member; 85b transmission operation detection device; 86a operation member; 86b operation detection device; 91 engine speed sensor; 92 output speed sensor; 93 input speed sensor; 94 to 97 first to fourth hydraulic sensor; 98 boom angle detection device; 100 position determination unit; 101 image data obtaining unit; 102 image analysis unit; 103 loading work determination unit; 104 position calculation unit; 105 state obtaining unit; 106 representation control unit; 107 loading amount determination unit; 134 communication device; 140 loaded vehicle; 150 actuator; 154 operator's seat; 158 control device; 160, 202 vessel, and 300, 302 loading guidance

The invention claimed is:

1. A control system for a wheel loader including a vehicle body frame including a working machine and a wheel mounted on the vehicle body frame, and for executing excavation work by the working machine while moving forward and loading work forward, the control system comprising:
   a display; and
   a controller including a memory that stores instructions and a processor configured to execute the instructions to perform a method including:
      determining a position of loading on a loaded vehicle based on a state of loading on the loaded vehicle; and
      displaying, on the display, loading guidance corresponding to the determined position of loading based on the loaded vehicle which is laterally viewed.

2. The control system for the wheel loader according to claim 1, wherein the display is an optically transparent display.

3. The control system for the wheel loader according to claim 1, wherein the loading guidance includes an indication with which an operator can visually recognize a relative position of loading.

4. A control system for a work vehicle comprising:
   a display; and
   a controller including a memory that stores instructions and a processor configured to execute the instructions to perform a method including:
      determining a position of loading on a loaded vehicle based on a state of loading on the loaded vehicle; and displaying, on the display, loading guidance corresponding to the determined position of loading based on the loaded vehicle which is laterally viewed,
wherein the loading guidance includes an indication with which an operator can visually recognize a relative position of loading, and
wherein an arrow indicative of a position is adopted as the indication.

5. The control system for the wheel loader according to claim 1, wherein the processor is further configured to execute the instructions to perform the method including:
obtaining loading state data transmitted from the loaded vehicle, wherein the position of loading on the loaded vehicle is determined based on the loading state data.

6. The control system for the wheel loader according to claim 1, wherein a next position of loading on the loaded vehicle is determined based on a previous state of loading on the loaded vehicle.

7. A control system for a work vehicle comprising:
a display; and
a controller including a memory that stores instructions and a processor configured to execute the instructions to perform a method including:
determining a position of loading on a loaded vehicle based on a state of loading on the loaded vehicle;
obtaining image data including the loaded vehicle;
extracting the loaded vehicle included in the image data obtained;
calculating a position in the loaded vehicle on the display based on the extracted loaded vehicle; and
displaying, on the display, loading guidance corresponding to the determined position of loading based on the calculated position in the loaded vehicle which is laterally viewed.

8. A control method of a control system for a work vehicle comprising:
inputting data on a state of loading on a loaded vehicle;
determining a position of loading on the loaded vehicle based on the data on the state of loading;
inputting image data including the loaded vehicle;
extracting the loaded vehicle which is laterally viewed, based on the input image data;
generating data for loading guidance corresponding to the determined position of loading;
and outputting the data for the loading guidance corresponding to the extracted laterally viewed loaded vehicle to the display.

9. A method of controlling a work vehicle comprising:
obtaining data on a state of loading on a loaded vehicle;
determining a position of loading on the loaded vehicle based on the data on the state of loading;
obtaining image data including the loaded vehicle;
extracting the loaded vehicle which is laterally viewed, based on the obtained image data;
generating data for loading guidance corresponding to the determined position of loading; and
outputting the data for the loading guidance corresponding to the extracted laterally viewed loaded vehicle to the display.

* * * * *